J. G. WITT.
Rotary-Engines.

No. 146,627.          Patented Jan. 20, 1874.

Witnesses.
Joseph M. Roe
R. H. Ransom

Inventor.
John G. Witt

UNITED STATES PATENT OFFICE.

JOHN G. WITT, OF ELMIRA, NEW YORK, ASSIGNOR OF ONE-HALF HIS RIGHT TO CHARLES F. ROE, OF SAME PLACE.

IMPROVEMENT IN ROTARY ENGINES.

Specification forming part of Letters Patent No. 146,627, dated January 20, 1874; application filed March 13, 1873.

*To all whom it may concern:*

Be it known that I, JOHN G. WITT, of Elmira, in the county of Chemung, in the State of New York, have invented a new and useful Improvement on a Rotary Engine; and I do hereby declare that the following is a full, clear, and exact description of the construction and operation of the same, reference being had to the annexed drawing making a part of this specification, in which—

Figure 2:
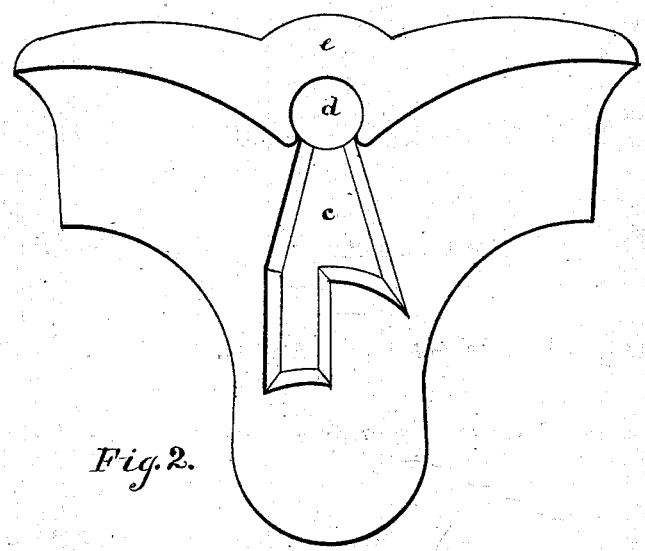
Figure 3:
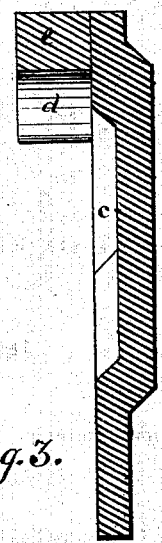
Figure 1:
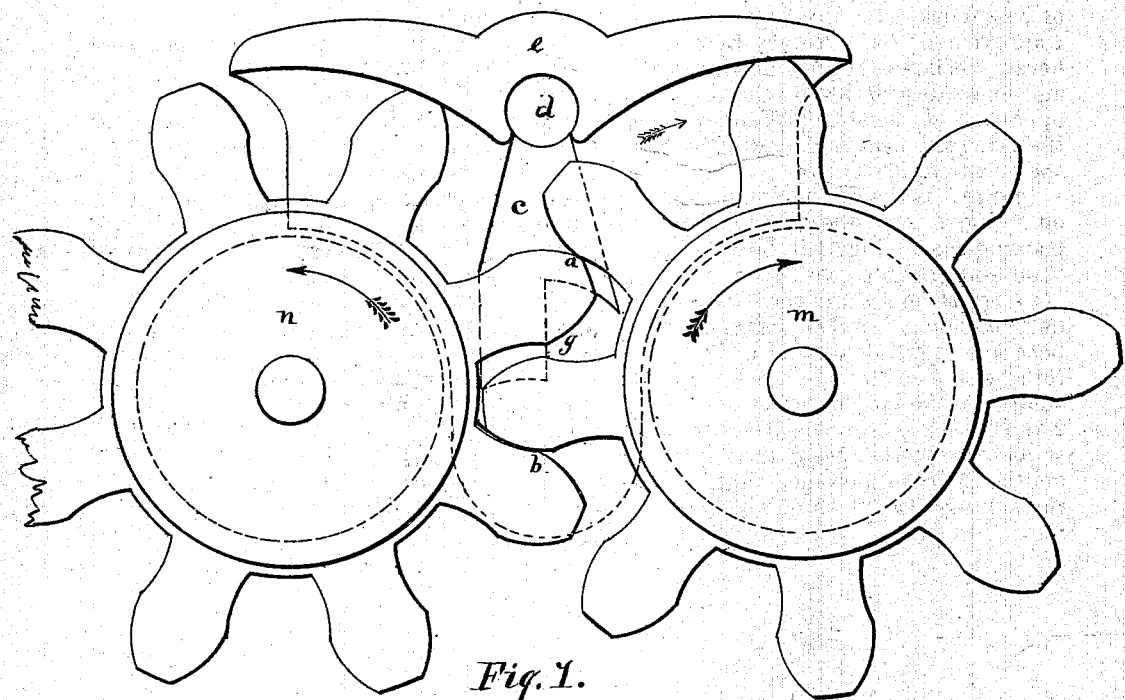

Figure 1 is a side view with the front head off. Fig. 2 is a side view of front head and packing-case. Fig. 3 is an end view of front head and packing-case.

Letter $m$ represents the driving-cam; $n$, the helping-cam; $a$ and $b$, steam-joints; $g$, space between cogs, as shown in Fig. 1. Letter $c$ represents a side passage or run-round for steam; $e$, the packing-case, as shown in Figs. 2 and 3. A pipe may be attached to the heads, so as to carry the steam around the joint $a$, as another form of passage. Letter $d$ represents the supply-pipe, as shown in Fig. 3.

The arrow shows the direction the cams run.

I find, in the rotation of the gears, as the point of the cogs on the helping-cam draws out from the root of the cogs on the driving-cam, more surface exposed to a backward pressure, that causes a weak point, which, in my invention, I overcome.

In my invention, I carry the steam down the passage $c$ to the space between the cogs $g$, and fill the space between the steam-joints $a$ and $b$, which exposes more surface in a forward motion, and overcomes the weak point.

What I claim as my invention, and desire to secure by Letters Patent, is—

The combination of the toothed wheels $m$ and $n$ with the passage $c$, packing-case $e$, and supply-pipe $d$, when constructed and arranged for operation substantially as and for the purpose set forth.

JOHN G. WITT.

Witnesses:
  JOSEPH M. ROE,
  R. H. RANSOM.